United States Patent [19]
Runciman

[11] Patent Number: 5,751,473
[45] Date of Patent: May 12, 1998

[54] DUAL WAVEBAND OPTICAL SYSTEM

[75] Inventor: Herbert Morrison Runciman, Glasgow, United Kingdom

[73] Assignee: Barr & Stroud Limited, Scotland, United Kingdom

[21] Appl. No.: 628,581

[22] Filed: Apr. 4, 1996

[51] Int. Cl.$^6$ .................................................. G02B 13/14
[52] U.S. Cl. ........................ 359/356; 359/355; 359/357; 250/332; 250/352; 250/353
[58] Field of Search .................................... 359/353, 355, 359/356, 357, 359, 587, 589; 250/332, 339.01, 352, 353, 370.06

[56] References Cited

U.S. PATENT DOCUMENTS 3,173,012  3/1965  De Winter ........................... 359/357
5,161,051  11/1992  Whitney et al. ..................... 359/357

Primary Examiner—Paul M. Dzierzynski
Assistant Examiner—Darren E. Schuberg
Attorney, Agent, or Firm—Bell Seltzer Intellectual Property Law Group; Alston & Bird LLP

[57] ABSTRACT

A dual-band optical system 10 preferably for use in the thermal infrared waveband provides initial detection of a target in a first waveband (8–12 μm) having a wide field of view and discriminated target recognition in the second waveband (3–5 μm) at higher magnification and narrow field of view without any field-of-view change mechanism. The system 10 comprises a detector array 11 which is responsive in both wavebands and an optical arrangement 16 with a common objective component 15 for both wavabands. One waveband is transmitted through dichroic beamsplitters 17,18 to the array 11 whereas the other waveband is reflected by the beamsplitters 17,18 and transmitted through a field lens 28 before reaching the array 11. Both wavebands are incident upon a spectrally selective aperture stop 20 providing a large aperture for the low magnification field and a small aperture for the high magnification field.

6 Claims, 3 Drawing Sheets

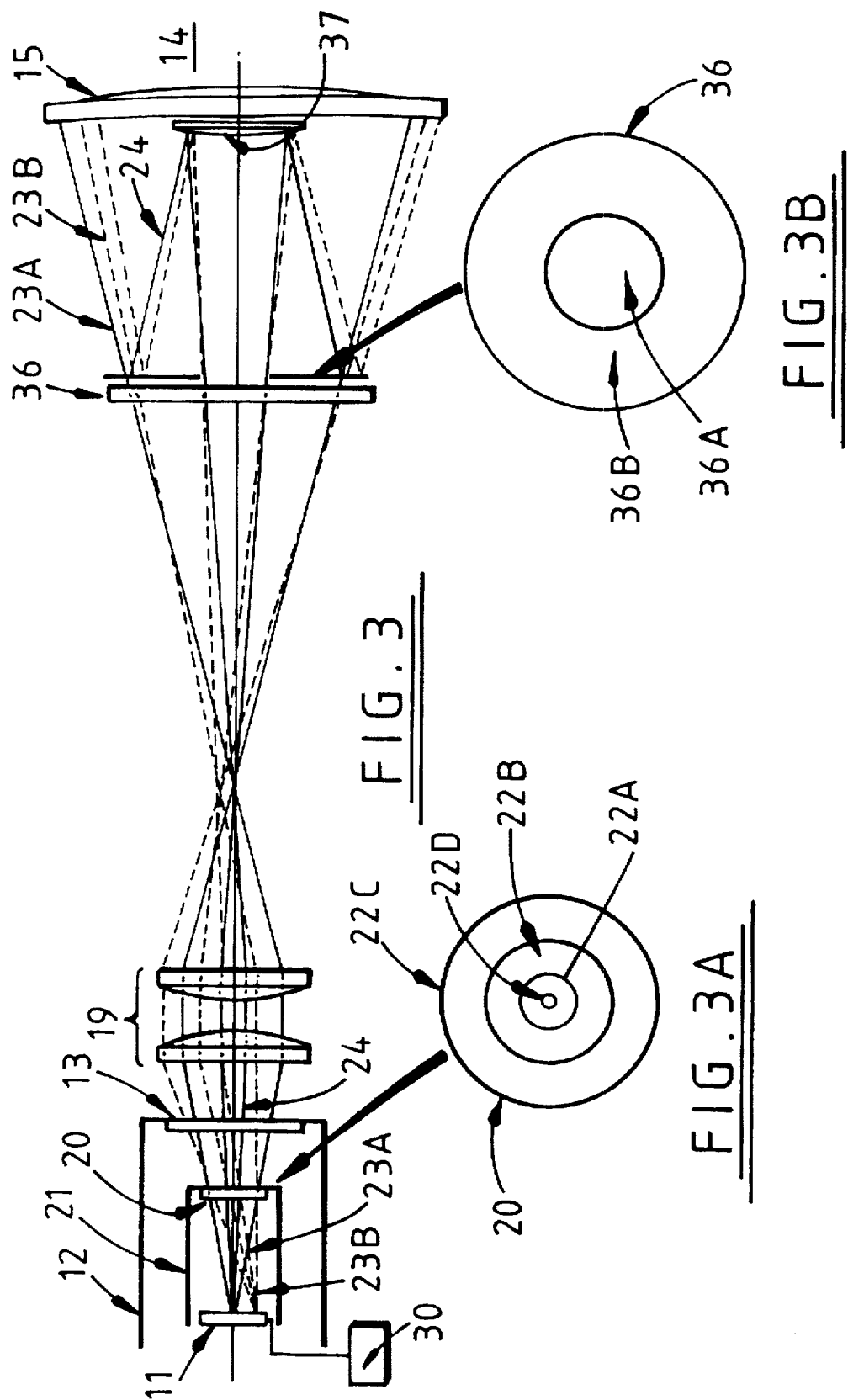

DUAL WAVEBAND OPTICAL SYSTEM

This invention relates to dual waveband optical systems particularly but not exclusively for use in the thermal infrared waveband.

BACKGROUND OF THE INVENTION

It is known that imaging of thermally emissive targets is possible either in the 3–5 µm waveband or in the 8–12 µm waveband and that discrimination of a target is better in the 8–12 µm waveband duo to there being loss clutter from spurious thermal emissions Lhan in the 3–5 µm waveband. Thus for initial detection of a thermal target a system operating in the 8–12 µm waveband and having a wide field of view is utilised but for target recognition, after initial detection, a higher magnification narrow field of view optical system is required. There is therefore a need for a mechanical field-of-view-change mechanism which renders the system comparatively complex. Furthermore the degree of resolution achieved at high magnification is diffraction limited unless very large optical components are used. Such large optical components are costly, difficult to manufacture and unwieldy in use.

SUMMARY OF THE INVENTION

It is an object of the present invention to provide a new and improved form of dual waveband optical system for use in the thermal infrared waveband.

According to the present invention there is provided an optical system for use in the thermal infrared waveband, said system comprising

- a cryogenically cooled detector array which is responsive to incident radiation in both the 3–5 µm and the 8–12 µm wavebands,
- and an optical imaging arrangement for receiving radiation in both said wavebands at a common optical component and for delivering images respectively formed from each of said wavebands to the detector array,
- said arrangement comprising a first channel for transmitting and forming an image from radiation in the 8–12 µm waveband, said first channel having a first focal length for a wide field of view with comparatively low magnification, a second channel for transmitting and forming an image from radiation in the 3–5 µm waveband, said second channel having a second focal length for a narrow field of view with comparatively high magnification, and a specifically selective cold shield located adjacent the detector array and at a common exit pupil for the first and second channels, the cold-shield providing a small diameter transmissive aperture for radiation in the second channel and a large diameter annular transmission aperture for radiation in the first channel, the ratio of said transmissive aperture diameters being substantially the same as the ratio of said focal lengths,
- and wherein an electronic read-out system is connected to said detector array which read-out system is capable of discriminating between said images to provide a separate read-out of the image in the 8–12 µm waveband from the image in the 3–5 µm waveband.

By virtue of the present invention target detection and subsequent target recognition can be achieved without the need for a mechanical field-of-view-change mechanism and without requiring introduction of large optical components.

The full aperture of the common optical component which receives radiation from the fields of view is used for both waveband images and the spot size in the focal plane, which contains the detector array, is the same for both wavebands so that the sharpness of the image is essentially the same in both wavebands.

Another object of the present invention is to provide a new and improved form of dual-band optical system for use in any waveband.

In accordance with this objective the present invention provides an optical system the focal length of which differs in two spectral wavebands, and in which the exit pupil for each waveband is determined by a spectrally-selective aperture, the aperture for each waveband being chosen in such a way that the diameter of the entrance pupil is similar in both bands, said optics comprising a first positively powered component (or group of components), a spectrally selective means of directing the radiation corresponding to one of the wavebands through a second optical component or group of components which in combination with said first optical component comprises a positively powered optical system of focal length which differs from that of said first optical component or group of components, and a means of causing the centre of the image formed by said first optical group independently and the centre of the image formed by said first optical group and said second optical group in combination to coincide in focus and position in the focal plane and a means of limiting the radiation in each of the chosen wavebands received by a detector to that which enters said first optical group, said means comprising re-imaging optics capable of passing radiation in both bands, and a spectral filter having spatial zones each of which transmits radiation only in each of the selected spectral bands.

When this aspect of the invention operates in the thermal infrared waveband the means for limiting the radiation received by the detector is the aforementioned cold shield. However, it is to be understood that the cold shield may or may not be cooled as part of the cryogenic system. The cold shield may be external to the cryogenic system and operating at ambient temperature in which case it is conveniently arranged on its rear surface adjacent the detector to reflect radiation emanating from the detector back to the detector whilst excluding external radiation outside the desired acceptance angle.

BRIEF DESCRIPTION OF THE DRAWINGS

Embodiments of the present invention will now be described by way of example with reference to the accompanying drawings, in which

FIG. 3 illustrates a further embodiment of the present invention, operating on the catadioptic principle, and FIGS. 3A and 3B illustrate different details of the FIG. 3 system.

DETAILED DESCRIPTION OF PREFERRED EMBODIMENTS

Figures 1, 1A:
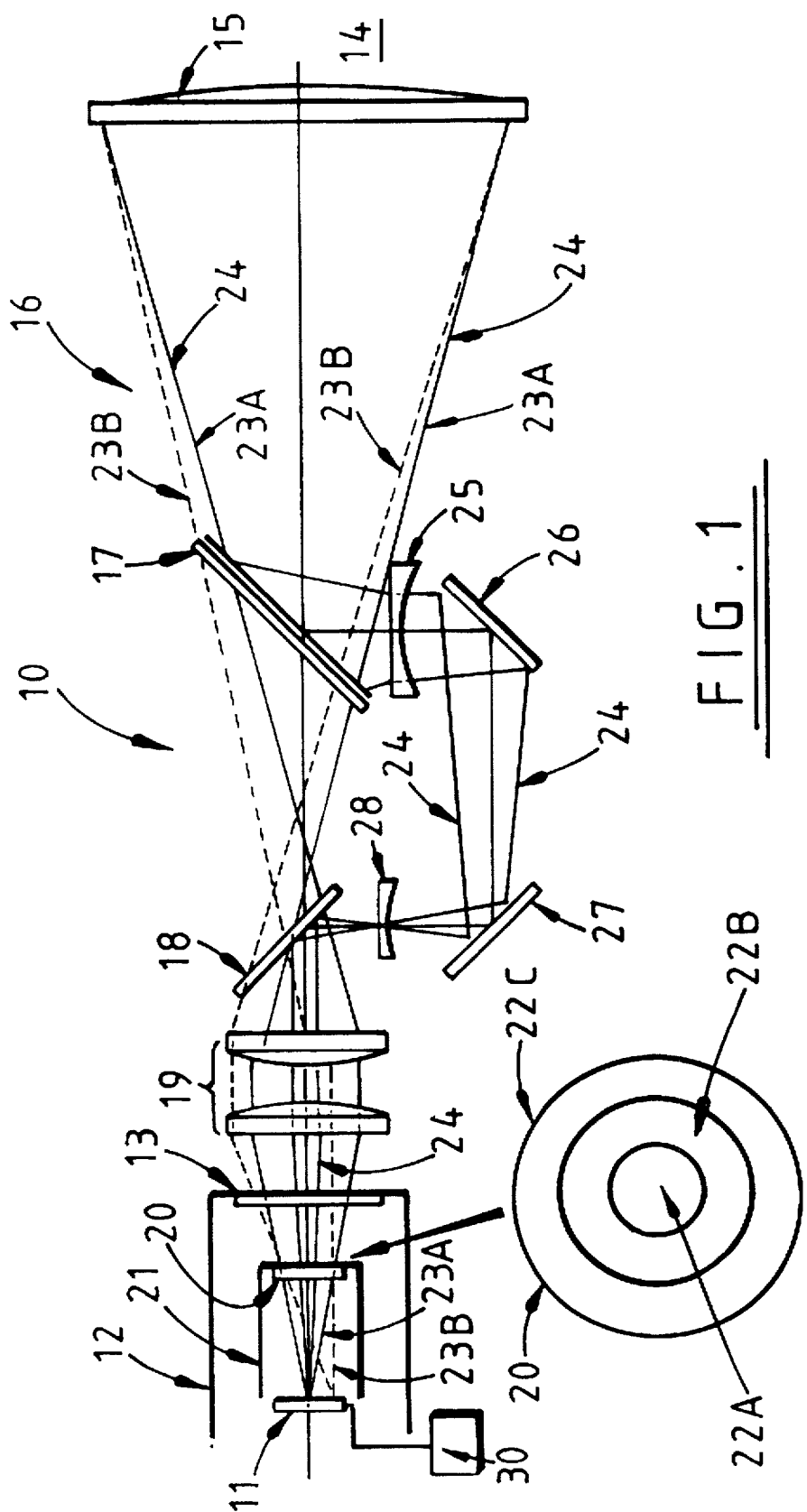
FIG. 1 illustrates a first embodiment of the present invention in which both radiation channels are free from obstruction.
FIG. 1A illustrates a detail of FIG. 1.

The optical system 10 shown in FIG. 1 is for use in the thermal infrared waveband and comprises a cryogenically cooled detector array 11 which is responsive to incident radiation in both the 3–5 82 m waveband and the 8–12 82 m waveband. The array 11 is mounted within a cryogenically cooled housing 12 which has a radiation-transmissive window 13 made for example from germanium. Radiation emanating from a remote field 14 is received at a common entrance pupil formed on a common optical component 15 which in this instance is a lens (for example an achromatic combination of lens elements made of one or more of the materials Germanium, Zinc Sulphide, and Zinc Selenide) and which forms the objective of an optical imaging arrangement generally denoted 16 which delivers images respectively formed from the 3–5 µm waveband and the 8–12 µm waveband to the array 11.

The arrangement 16 comprises a first channel for transmitting, and forming an image forming radiation in the 8–12 µm waveband, the first channel being formed by the objective lens 15, two beamsplitters 17,18 which are transmissive in the 8–12 µm waveband and a relay lens 19 (which may be made of one or more of the materials Germanium, Zinc Sulphide, and Zinc Selenide to provide for control of chromatic aberration). The relay lens 19 is arranged to form an image of the objective on a cold shield 20 (for example made of Germanium) which is mounted on a baffle 21 within the sealed housing 12.

The cold shield 20 is shown more particularly in FIG. 1A and consists, for example, of a germanium disc or plate with one or more spectrally selective surface coatings arranged in concentric zones on the disc. The central zone 22A is transmissive in the 3–5 µm waveband region and the adjacent annular zone 22B is transmissive in the 8–12 µm waveband. In FIG. 1A the outermost annular zone 22C is nontransmissive in the thermal wavebands.

The coatings required for the cold shield 20 are of well-established types. For the outer zone, coatings of the type already in use on detector windows to limit the response to wavelengths greater then 7.5 µm can be used (for example as set forth in the data sheets for product codes FA and NR issued in January, 1984 and in March, 1986 respectively by STC Components Ltd). In some cases the inner zone may simply consist of an anti-reflection coating (e.g. Pilkington Optronics ARG3) so that the whole cold shield aperture is available for the wide field of view, although in some cases a filter which eliminates radiation at wavelengths above about 5 µm is to be preferred in order to eliminate out-of-band radiation. All of the required or desired filter coatings are within the state of the art, production of the annular shape may be achieved by masking during evaporation or, for greater precision, by photoresist techniques. Conveniently the coating to form zone 22B is formed on the opposite surface of the disc or plate from the coating which forms the central zone 22A.

The first channel of the arrangement 16 which transmits in the 8–12 µm waveband is illustrated by centre and edge of field rays 23A,23B and has a first local length which provides for a wide field of view with comparatively low magnification. Typically the first focal length is about 150 mm. The exit pupil formed by the beamsplitter 18 is relayed to coincide in size with annular zone 22B of the cold-shield and is focused on the detector array 11.

The arrangement 16 further includes a second channel for transmitting, and forming an image from, radiation in the 3–5 µm waveband, the second channel being formed by the objective lens 15, the beamsplitter 17 now functioning as a reflector, a focal length changing lens 25 (made of Germanium, for example) fold mirrors 26, 27, a field lens 28 (made of Germanium, for example) which changes the position of the exit pupil to coincide with the beamsplitter 18 now functioning as a reflector but without altering focal length of the second channel, and the relay lens 19. The second channel is illustrated by centre of field rays 24 and has a second focal length which provides a narrow field of view with comparatively high magnification. Typically the second focal length is about 500 mm and the exit pupil formed by the beamsplitter in the 3–5 µm waveband is relayed by the relay lens 19 to coincide in size with central zone 22A of the cold shield 20.

The ratio of the diameters of zones 22A and 22B is substantially the same as that of the ratio of the focal lengths of the channels at about 3 to 1 so that the blur spot size at the detector array 11, arising due to diffraction, is substantially the same for both channels so that the sharpness of the images formed is essentially the same in both wavebands. Furthermore the full aperture of the objective lens is is utilised for both wavebands and there are no moving components in the system.

The detector array 11 preferably uses multiple quantum well detectors either of the type made and sold by Thomson CSF, S.A. or Martin Marrietta Inc., the basic principles of such detectors being described in "Infra-red detectors reach now lengths" by Gunapala et al, published in Physics World, December 1994) and is connected to an electronic read-out system 30 (shown schematically) capable of discriminating between the two images to provide a separate read out of the image in the 8–12 µm waveband from the image in the 3–5 µm waveband. The detector array 11 is of course a staring array having identical geometry for both wavebands.

In a modification of the system 10 components 17,18,25, 26,27 and 28 ace mounted in common on a pivotal platform such that when operating the first channel beamsplitters 17,18 are not utilised and only radiation in the 8–12 µm waveband is incident upon the detector array 11. The beamsplitters 17,18 in this instance may be non transmissive in the 8–12 µm region but reflective in the 3–5 µm region so that when the platform is moved to bring the beamsplitters 17,18 into the radiation path only the 3–5 µm waveband is incident upon the detector array 11. In this modification the electronic read-out system 30 from the detector array 11 discriminates between tho two waveband images on a temporal basis. Additionally it will be understood that there are numerous possible forms of pivotal platforms and lens elements of the first channel may be moved out of circuit when lens elements of the second channel are moved into circuit in order to eliminate the need for any beamsplitters 17,18. In this case each channel would of course require a blocking filter to block radiation relevant to the other channel.

Figure 2:
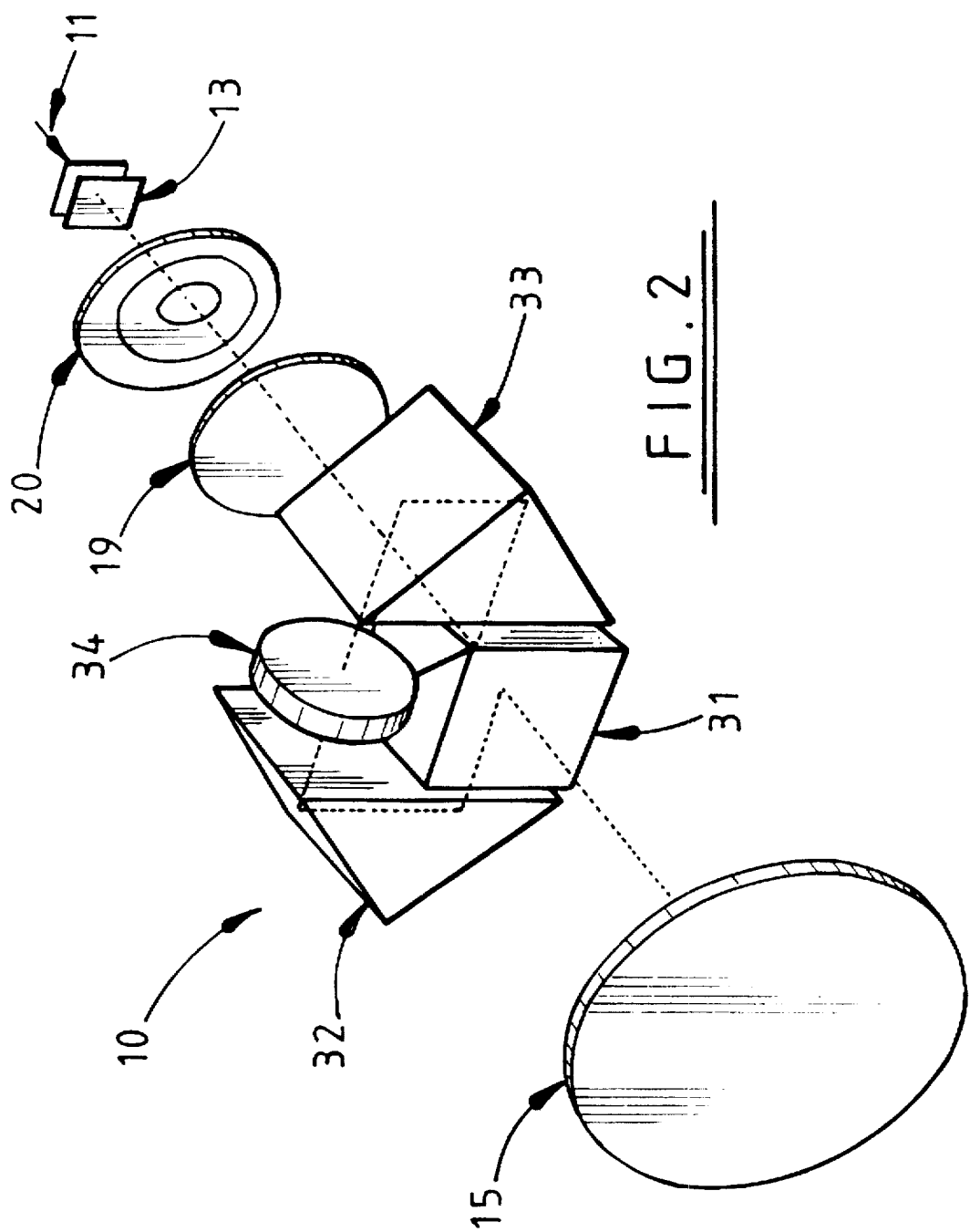
FIG. 2 illustrates a second embodiment of the present invention.

FIG. 2 illustrates schematically an alternative form of the optical system 10 in which the dichroic beamsplitters 17,18 are united into a single beamsplitter for the purposes of reducing transmission losses. The single beamsplitter is housed within a cube 31 and the second channel for the 3–5 µm waveband is reflected by fold prisms 32,33 with an intervening telephoto lens 34 which combines the functions of lenses 25 and 28 of FIG. 1. In this case the cold shield 20 is located externally of the cryogenic housing and its window 13.

In a modification ot the FIG. 2 system the cube beamsplitter 31 is replaced by a plate or pollicle beamsplitter and the fold prisms 32,33 by a series of mirrors.

FIG. 3 illustrates a further form of the system 10 operating on the catadioptic principle. In this case the dichroic beamsplitters 17,18 are replaced by a single beamsplitter 36 which is annularly spectrally selective in relation to the 3–5 μm waveband. The beamsplitter 36 is shown in FIG. 3B and has a central zone 3GA which transmits 3–5 μm radiation and an outer annular zone 36B which reflects 3–5 μm radiation but transmits 8–12 μm radiation. The rear surface of the lens 15 carries a powered reflector 37 to reflect the 3–5 μm radiation reflected by zone 36B through zone 36A to the relay lens 19.

FIG. 3A illustrates the cold shield 20 for the FIG. 3 system this being similar to that of FIG. 1A with the exception of a small centralised spot 22D which is non-transmissive to radiation either in the 3–5 μm waveband or in the 8–12 μm waveband.

In the FIG. 3 system the relay lens 19 projects an image of the beamsplitter 36 on the cold shield 20, so that only radiation passes through the central zone 36A of the beamsplitter 36 passes through the central zone 22A of the cold shield 20.

In a modification of the FIG. 3 system the relay lens 19 is arranged to project an image of the reflector 37 onto the cold shield 20. This results in an improved pupil position match for the two wavebands but it may be required in this case to surround the reflector 37 with an annular baffle to block stray radiation.

I claim:

1. An optical system for use in the thermal infrared waveband, said system comprising cryogenically cooled detector array which is responsive to incident radiation in both the 3–5 μm and the 8–12 μm wavebands, and an optical imaging arrangement for receiving radiation in both said wavebands at a common optical component and for delivering images respectively formed from each of said wavebands to the detector array, said arrangement comprising a first channel for transmitting and forming an image from radiation in the 8–12 μm waveband, said first channel having a first focal length for a wide field of view with comparatively low magnification, a second channel for transmitting and forming an image from radiation in the 3–5 μm waveband, said second channel having a second focal length for a narrow field of view with comparatively high magnification, and a spectrally selective cold shield located adjacent the detector array and at a common exit pupil for the first and second channels, the cold-shield providing a small diameter transmissive aperture for radiation in the second channel and a large diameter annular transmission aperture for radiation in the first channel, the ratio of said transmissive aperture diameters being substantially the same as the ratio of said focal lengths, and wherein an electronic read-out system is connected to said detector array which read-out system is capable of discriminating between said images to provide a separate read-out of the image in the 8–12 μm waveband from the image in the 3–5 μm waveband.

2. An optical system as claimed in claim 1, wherein the second channel incorporates a field lens.

3. An optical system as claimed in claim 1, wherein the first and second channels are separated and recombined by one or more dichroic beamsplitters.

4. An optical system as claimed in claim 3, wherein the dichroic beamsplitter is in the form of a single annular element and the common optical component forms part of a catadioptic arrangement to radiation in the second channel.

5. An optical system as claimed in claim 4, wherein the cold shield further includes a small centralized spot which is non-transmissive to radiation in either the 3–5 μm or 8–12 μm waveband.

6. An optical system having a focal length that differs in two spectral wavebands, and in which an exit pupil for each waveband is determined by a spectrally-selective aperture, the aperture for each waveband being chosen in such a way that the diameter of an entrance pupil is similar in both bands, said optics comprising a first positively powered optical component, a spectrally selective means of directing the radiation corresponding to one of the wavebands through a second optical component which in combination with said first positively powered optical component comprises a positively powered optical system of focal length which differs from that of said first positively powered optical component, and a means of causing the centre of the image formed by said first positively powered optical component independently and the centre of the image formed by said first positively powered optical component and said second optical component in combination to coincide in focus and position in the focal plane and a means of limiting the radiation in each of the chosen wavebands received by a detector to that which enters said first positively powered optical component, said means comprising re-imaging optics capable of passing radiation in both bands, and a spectral filter having spatial zones each of which transmits radiation only in each of the selected spectral bands.

* * * * *

UNITED STATES PATENT AND TRADEMARK OFFICE
CERTIFICATE OF CORRECTION

PATENT NO. : 5,751,473
DATED : May 12, 1998
INVENTOR(S) : Runciman

It is certified that error appears in the above-identified patent and that said Letters Patent is hereby corrected as shown below:

On the title page, col. 1, insert -- Foreign Application Priority Data April 13, 1995 United Kingdom 9507671 --.

On the title page, col. 2, omit the semicolon (;) in the firm name.

On the title page, col. 2, in the Abstract, line 9, "wavabands" should be -- wavebands --.

Col. 5, line 30, before "cryogenically" insert -- a --.

Signed and Sealed this

Eleventh Day of August 1998

*Attest:*

BRUCE LEHMAN

*Attesting Officer*  *Commissioner of Patents and Trademarks*